June 7, 1966 H. ULANET 3,255,331
IMMERSION THERMOSTATIC SWITCH
Filed July 5, 1960

INVENTOR.
Herman Ulanet
BY John N. Bain
ATTORNEY

United States Patent Office 3,255,331
Patented June 7, 1966

3,255,331
IMMERSION THERMOSTATIC SWITCH
Herman Ulanet, 473 Richmond Ave., Maplewood
Township, Essex County, N.J.
Filed July 5, 1960, Ser. No. 40,851
8 Claims. (Cl. 200—138)

My invention relates to thermostats generally and specifically to a shock and vibration resistant thermostatic switch adapted to sense the temperature of fluids, either liquids or gases, by immersion therein.

There are many military and domestic applications for a thermostatic electric switch of the immersion type that are highly resistant to extreme conditions of shock and vibration. The well known bimetallic strip thermostat with its bimetal secured to a post at one end and freely cantilevered in juxtaposition to a fixed contact at the other end is virtually useless under conditions of extreme shock or vibration. In switches employing such a structure shock or vibration causes the bimetal to bounce and jump, making and breaking the circuit in response to mechanical stress rather than thermal stress. Domestically, extreme conditions of shock and vibration are frequently found in small engines such as outboard motors as well as many other appliances. Militarily, the missile industry is but one instance wherein thermostats must withstand extreme shock due to acceleration or deceleration as well as vibration due to aerodynamic phenomena or rocket motor operation.

Therefore, it is among the objects and advantages of my invention to provide a thermostatic switch which will operate efficiently under conditions of extreme shock and vibration.

Another object of my invention is to provide a thermostatic switch which may be immersed in fluids, either liquids or gases, for efficient, rapid and accurate thermal sensitivity.

Yet a further object of my invention is to provide a thermostatic switch in which the thermosensitive elements and electrical contact members are securely sealed within a closed cartridge safe from dust, dirt, grease and corrosive substances.

Still another object of my invention is to provide a thermostatic switch which may be firmly and tightly yet removably attached to an appliance, secure against accidental detachment due to shock or vibration.

Another object of my invention is to provide a thermostatic switch which may be easily calibrated to open or close at any desired temperature.

Yet another object of my invention is to provide a thermostatic switch which may function as a normally open or normally closed switch.

A further object of my invention is to provide a thermostatic switch which may be easily fabricated from inexpensive materials.

These objects and advantages as well as other objects and advantages may be achieved by my invention, one embodiment of which is illustrated in the drawings in which.

Figure 1:
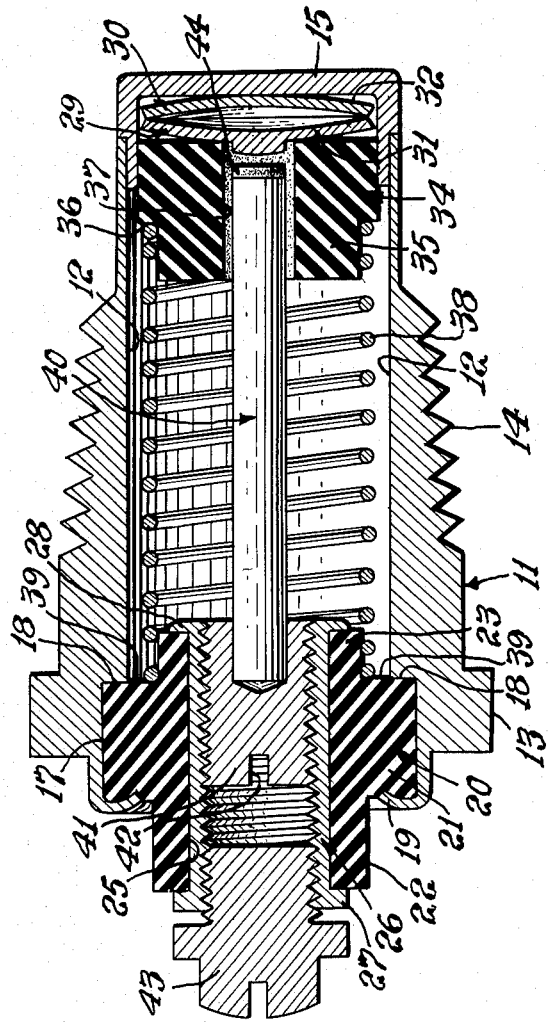
FIGURE 1 is a side elevational, cross-sectional view of my thermostatic switch assembled.
Figure 2:
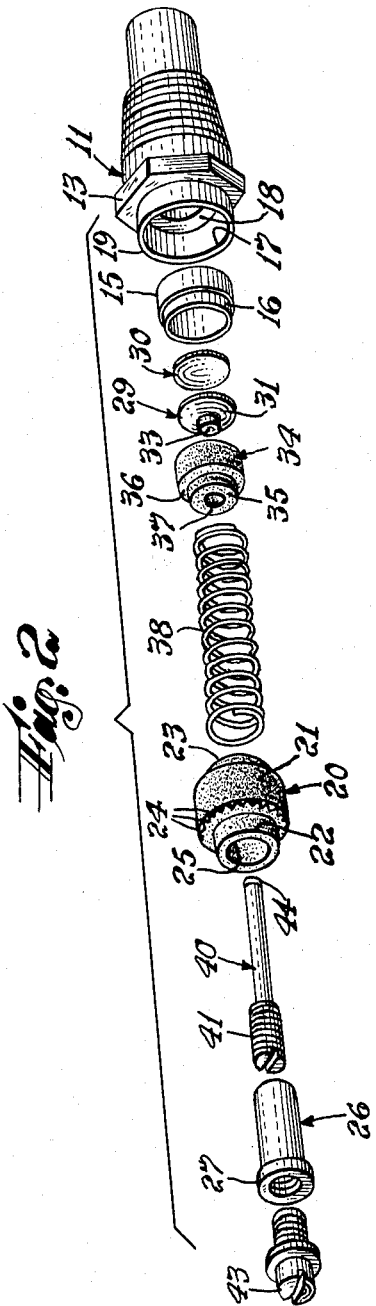
FIGURE 2 is a view in perspective of my thermostatic switch exploded along its longitudinal axis.

Referring now to the drawings in detail, my invention comprises a generally cylindrical body or cartridge 11 having an axial bore 12. A hexagonal nut 13 is formed integrally on the external surface of the cartridge 11 near its top end. The cartridge 11 is provided with machine threads 14 on its external surface below the nut 13. The threads 14 may have a constant pitch diameter or may be tapered as is shown in the drawings. The bottom end of the cartridge 11 is closed with a cap 15 having an annular lip 16 which telescopes within the bore 12 of the cartridge 11. The cap 15 may be secured to the cartridge 11 in any convenient manner such as by brazing. It should be noted, however, that the cartridge 11 may be fabricated as an integral unit with the bottom end closed, thereby dispensing with the necessity for the cap 15.

The axial bore 12 communicates with a cylindrical recess 17 at the top of the cartridge 11 having an internal diameter larger than that of the bore 12. The intersection of the bore 12 and the recess 17 defines an annular shoulder 18. The top of the cartridge 11 is open, terminating in a relatively thin-walled, annular lip 19. A cylindrical insulator 20 is seated within the recess 17. The insulator 20 has a body portion 21 having a diameter approximately equal to that of the recess 17 and an outer neck 22 and an inner neck 23 of reduced diameter. The intersection between the body 21 and the inner neck 23 defines an annular shoulder 39. The body 21 abuts against the shoulder 18 while the neck 23 projects into the bore 12. The lip 19 of the cartridge 11 is rolled over against the body 21 of the insulator 20 thereby securing it within the recess 17. The insulator 20 may be secured against rotation within the recess 17 by a plurality of wedges 24 cut in the outer periphery of the body 21 beneath the rolled lip 19.

The insulator 20 is provided with an axial bore 25. Seated within the bore 25 is an electrically conductive internally threaded annular collar 26 secured therein by an integral external annular flange 27 on its top end and a thin wall edge 28 rolled over against the inner neck 23 of the insulator 20 on its bottom end. The collar 26 may be secured against rotation within the bore 25 by means of roughening the surface of the neck 23 beneath the edge 28 with a plurality of cross-cuts.

A pair of bimetallic elements 29, 30 are seated within the cap 15 at the bottom of the cartridge 11. The bimetallic elements are convex discs, positioned in opposition to one another, touching at the periphery and separated at their centers. They have a diameter approximately equal to the internal diameter of the cap 15. The high expansion metal is located on the convex, outer surfaces 31, 32 respectively of the elements 29, 30. Bimetal 30 is engaged with the cap 15 at its center, whereas bimetal 29 is provided with an electrically conductive contact 33 at its outer, convex center.

A cylindrical insulator 34 is slidably seated within the annular lip 16 on the cap 15. The insulator 34 has an inner integral neck 35 of reduced diameter which defines an annular shoulder 36. The diameter of the inner neck 35 of the insulator 34 is equal to the diameter of the inner neck 22 on the insulator 20. The insulator 34 is also provided with an axial bore 37. A coil spring 38 is positioned between the insulators 20, 34, abutting against the annular shoulders 36 and 37. The spring 38 is normally under compression urging the insulators 20 and 34 apart. The insulator 34 is then pressed firmly into engagement with the bimetal 29 with the contact 33 projecting into the bore 31.

An electrically conductive rod 40 is slidably positioned within the bore 36 in the insulator 34, with its contact end 44 spaced a short distance away from the contact 33 on the bimetal 29. The opposite end of the rod 40 is secured to an electrically conductive calibration screw 41 threadably engaged within the collar 26. The screw 41 is provided with an adjustment slot 42 in its outer end. A threaded contact screw 43 is engaged within the collar 26 at its outer end being spaced apart from the top of the calibration screw 41.

In operation, my thermostat may be assembled in the manner shown in FIGURE 1 of the drawings. The cartridge may be tightly screwed into the jacket carrying the fluid to be sensed. With this particular arrangement of the component parts the switch is normally open, that is, at normal ambient temperatures the electrical circuit is open. However, it should be noted that the switch may be made normally closed by merely reversing the bimetals 29, 30 so that they touch at their centers. The contact 33 is then positioned on the concave inner face of bimetal 29.

When the thermostat is assembled for normally open operation, the electrical circuit extends from the cartridge 11, which may be considered a "ground," through the cap 15 to the bimetals 29, 30 and the contact 33. The cartridge 11 and cap 15 should be fabricated of a material which is both a good electrical conductor and a good thermal conductor. I have found that yellow brass is suitable for many applications.

The bottom end of the thermostat and the cap 15 are immersed in the fluid the temperature of which is to be sensed. As the temperature of the fluid rises, the bimetals are quickly and efficiently heated. The bimetals 29, 30 expand along the high expansion side to assume a greater convexity. The bending bimetals gradually force the insulator 34 away from the cap 15 against the urging of the coil spring 38. However, the conductive rod 40 remains unmoved within the bore 37. Eventually, if the temperaturet rises sufficiently, the bimetals will become convex enough to bring the contact 33 into engagement with the contact 44 of the rod 40. The circuit then extends from the bimetals 29, 30, through the conductive rod 40 and calibration screw 41 to the conductive collar 26, through the conductive collar 26 to the contact screw 43, thereby closing the circuit. The degree of temperature rise necessary to close the circuit may be adjusted by means of the calibration screw 41 which shortens or lengthens the ambient distance between the contact end 41 of the rod 40 and the contact 33 on the bimetal 29.

A switch assembled for normally closed operation functions in the same manner. The bimetals are reversed, touching at their centers with the peripheries separated. The high expansion metal is on the concave side and the contacts 41, 33 normally engaged. As the temperature rises, the bimetals assume a less convex configuration, causing the contacts to separate and break the circuit.

As may be readily appreciated, all of the component parts of my thermostat are firmly seated in position and cannot be dislodged by vibration or shock. Thus, the bimetals 29, 30 will not bounce or jump in response to mechanical stress but will move only in response to thermal stress.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A thermostatic switch comprising an electrically and thermally conductive hollow body closed at one end, a pair of opposed, convex-concave, thermosensitive bimetals seated within the closed end of the hollow body and resiliently engaged with each other and the body, a movable insulator resiliently engaged with one of the bimetals, the movable insulator having a bore, a stationary insulator seated within the opposite end of the body, means between the movable insulator and fixed insulator for maintaining said movable insulator in resilient engagement with the bimetals, an electrically conductive rod slidably mounted within the bore in the movable insulator having one end positioned for electrical contact with one of the bimetals whereby changes in the curvature of the bimetals will cause the rod to engage and disengage the bimetal, and electrically conductive means communicating through the stationary insulator and connected to the opposite end of the said rod, and an external electrical contact member connected to the said conductive means but electrically insulated from the body.

2. A thermostatic switch comprising an electrically and thermally conductive hollow body closed at one end, a pair of opposed, concave-convex bimetals seated within the closed end of the body and resiliently engaged with each other and the closed end of the body, a movable insulator seated within the hollow body resiliently engaged with one of the bimetals, the movable insulator having a bore, a stationary insulator seated within the opposite end of the body, means between the movable insulator and fixed insulator for maintaining said movable insulator in resilient engagement with the bimetals the stationary insulator having a bore, an electrically conductive, internally threaded annular collar seated within the bore in the stationary insulator, a threaded calibration screw positioned within the collar, an electrically conductive rod mounted within the hollow body having one end secured to the calibration screw and the opposite end slidably positioned within the bore in the movable insulator for electrical contact with one of the bimetals in response to thermally induced changes in the curvature of the bimetals, and an external, electrical contact member electrically connected to the collar but electrically insulated from the body.

3. A thermostatic switch comprising a generally cylindrical, electrically and thermally conductive cartridge closed at one end, a pair of opposed, concave-convex, thermosensitive bimetalic discs seated within the closed end of the cartridge and resiliently engaged with each other and the cartridge, a longitudinally movable insulator slidably mounted within the cartridge and resiliently engaged with one of the bimetalic discs, the movable insulator having a longitudinal bore, a stationary insulator secured within the cartridge at the opposite end, said stationary insulator having a longitudinal bore, a coil spring mounted between the stationary insulator and the movable insulator, the spring being normally under compression thereby maintaining the movable insulator in resilient engagement with the bimetalic disc and the bimetalic discs in resilient engagement with the closed end of the cartridge, an electrically conductive, annular, internally threaded collar mounted within the bore in the stationary insulator, an electrically conductive calibration screw threadably engaged within the collar, an electrically conductive rod secured at one end to the calibration screw and having the opposite end slidably mounted within the bore in the movable insulator and positioned for electrical contact with the said one bimetalic disc whereby changes in the curvature of the bimetalic discs cause the rod to engage and disengage the bimetalic disc, and an external, electrical contact member electrically connected to the collar but insulated from the cartridge.

4. A thermostatic switch comprising an electrically and thermally conductive, generally cylindrical cartridge having an internal bore and being closed at one end, a pair of opposed, normally convex-concave bimetalic discs seated within the bore in the cartridge at the closed end and resiliently engaged with each other and the closed end of the cartridge, a longitudinally movable insulator slidably mounted within the cartridge and resiliently engaged with one of the bimetalic discs, the movable insulator having a longitudinal bore, a stationary insulator secured within the bore in the cartridge at the end opposite the discs, the stationary insulator having a longitudinal bore, a coil spring mounted between the stationary insulator and the movable insulator, the spring being normally under compression thereby maintaining the movable insulator in resilient engagement with the bimetalic discs and the bimetalic discs with the closed end of the cartridge, an electrically conductive, annular, internally threaded collar mounted within the bore in the stationary insulator, an electrically conductive calibration screw threadably engaged within the collar, an electrically conductive rod attached at one end to the calibration screw and having its opposite end slidably mounted within the bore in the movable insulator, an electrical contact on the end of the rod in the bore positioned for electrical contact with an opposing electrical contact on one of the bimetalic discs whereby changes in the curvature of the bimetalic discs cause the said contacts to engage and disengage each other, an electrically conductive contact member threadably engaged with the conductive collar spaced away from the calibration screw and extending beyond the end of the stationary insulator, the said electrically conductive contact member being electrically insulated from the cartridge, an external nut formed integrally on the exterior of the cartridge, and external threads formed on the exterior of the cartridge.

5. A thermostatic switch comprising the structure in accordance with claim 1 and means to secure the stationary insulator against rotation within the hollow body.

6. A thermostatic switch comprising the structure in accordance with claim 2, means to secure the stationary insulator against rotation within the hollow body, and means to secure the collar against rotation within the bore in the stationary insulator.

7. A thermostatic switch comprising the structure in accordance with claim 3 wherein the thermosensitive bimetals are a pair of concave-convex bimetalic discs normally engaged at their peripheries and spaced apart at their centers, the high expansion metal being on the convex side of each disc.

8. A thermostatic switch comprising the structure in accordance with claim 1 wherein the thermosensitive bimetals are a pair of concave-convex bimetalic discs normally engaged at their centers and spaced apart at their peripheries, the high expansion metal being on the concave side of each disc.

References Cited by the Examiner

UNITED STATES PATENTS

| | | | |
|---|---|---|---|
| 812,776 | 2/1906 | Taylor | 200—67 |
| 1,434,633 | 11/1922 | Rohne | 200—137 |
| 2,127,575 | 8/1938 | Thompson et al. | 200—122 |
| 2,230,770 | 2/1941 | Van Almelo | 200—138 |
| 2,497,025 | 2/1950 | Clason | 200—140 |
| 2,753,421 | 7/1956 | Mertler | 200—138 |
| 2,839,635 | 6/1958 | Hasselhorn | 200—113 |

BERNARD A. GILHEANY, *Primary Examiner.*

MAX L. LEVY, *Examiner.*

ROBERT K. SCHAEFER, B. DOBECK, A. BARTIS, L. A. WRIGHT, T. D. MACBLAIN,
*Assistant Examiners.*